(No Model.)
J. BUTLER.
FEED CUTTER.
No. 503,716. Patented Aug. 22, 1893.
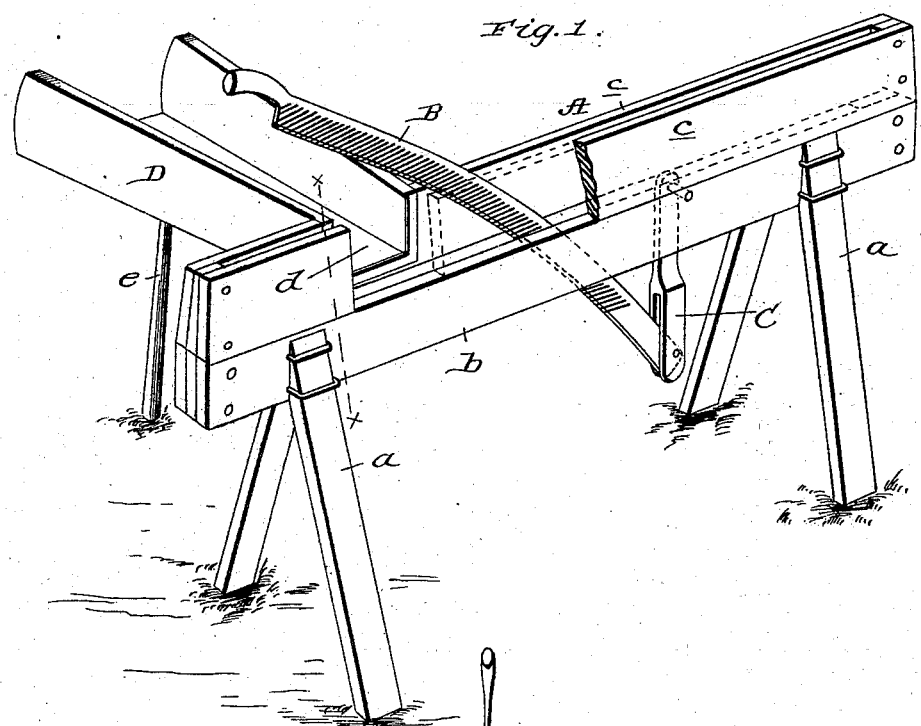
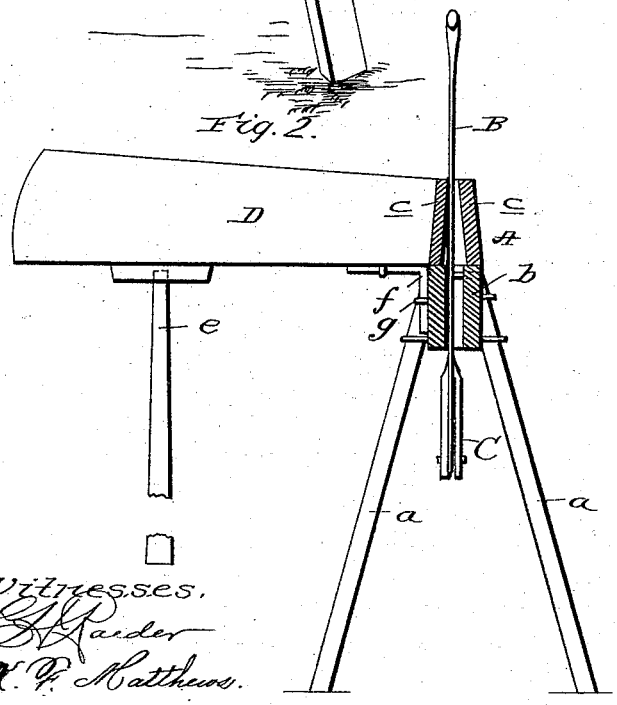
Witnesses.
G. H. Raeder
H. F. Matthews.
Inventor
Jacob Butler.
By James J. Sheehy.
Attorney

UNITED STATES PATENT OFFICE.

JACOB BUTLER, OF WILLOW POINT, TEXAS, ASSIGNOR OF ONE-HALF TO JOSEPH ROTH, OF SAME PLACE.

FEED-CUTTER.

SPECIFICATION forming part of Letters Patent No. 503,716, dated August 22, 1893.

Application filed March 28, 1893. Serial No. 467,986. (No model.)

*To all whom it may concern:*

Be it known that I, JACOB BUTLER, a citizen of the United States, residing at Willow Point, in the county of Wise and State of Texas, have invented certain new and useful Improvements in Feed-Cutters; and I do declare the following to be a full, clear, and exact description of the invention, such as will enable others skilled in the art to which it appertains to make and use the same.

My invention relates to improvements in feed cutters, and its novelty will be fully understood from the following description and claim when taken in connection with the accompanying drawings, in which—

Figure 1, is a perspective view of my improved feed cutter, with a portion of the knife casing or frame broken away. Fig. 2, is a vertical transverse section taken in the plane indicated by the line $x, x$, of Fig. 1.

Referring by letter to the said drawings:—A, indicates the knife casing or frame of my improved cutter. This casing or frame is supported by suitable legs or standards $a$, as shown, and it comprises, by preference, the vertically disposed side walls $b$, and the upwardly and inwardly inclined side walls $c$, which latter are provided adjacent to their forward ends with transverse openings $d$, for the passage of hay or other feed to be cut. By reason of the casing walls $c$, being inclined upwardly, and inwardly, it will be seen that the cutting knife B, is guided and braced without interfering with the cutting action thereof; the space between the walls $c$, at the cutting point being sufficiently wide to prevent choking. The cutting knife B is beveled upon one side only, and it has a file surface upon its beveled side so as to facilitate its cutting action, and it is connected to the casing A, through the medium of a link C, as shown, whereby it will be seen that said knife may be manipulated so as to make a drawn cut, which is highly desirable when the hay or other feed is cut, in large bunches, as is obvious.

D, indicates the feed trough of my cutter which is disposed at right angles to the casing A, and is arranged opposite the openings $d$, as illustrated. This trough is supported by a leg $e$, arranged as shown, and it is detachably connected to the casing A, by the angular bracket $f$, the depending leg of which takes through a staple $g$, upon the casing as better shown in Fig. 1. Thus it will be seen that when the cutter is not in use, the trough may be readily disconnected from the casing or frame so that the cutter will take up but a minimum amount of space, which is an important advantage.

In the operation of my improved cutter, the hay or other feed is fed from the trough D, through the openings $d$, and the knife is reciprocated so as to cut the hay into the lengths desired. Thus it will be seen that my improved cutter may be operated by a single person who may feed the hay with one hand and reciprocate the knife with the other, and it will also be seen that the hay may be cut any length desired without adjusting the cutter, which is a highly important desideratum.

My improved cutter embodies an exceedingly cheap, simple and durable construction; it requires no lubrication; it may be easily operated by a single person, and it may be readily taken apart and repaired, when necessary without the employment of skilled labor, all of which are important advantages.

Having described my invention, what I claim is—

In a feed cutter, substantially as specified. the combination of the casing or frame comprising the upwardly and inwardly inclined side walls having the transverse openings $d$, the reciprocatory knife resting between the walls of the casing, the link connecting one end of said knife to the casing or frame, the staple connected to the casing or frame, the feed trough and a bracket connected to the feed trough and adapted to engage the staple of the casing or frame, substantially as and for the purpose set forth.

In testimony whereof I affix my signature in presence of two witnesses.

JACOB BUTLER.

Witnesses:
HENRY J. ROTH,
ANDREW SNEIDER.